May 27, 1952  H. M. DODGE  2,598,115
RESILIENT MOUNTING
Filed Oct. 20, 1948

INVENTOR
Howard M. Dodge
BY
Evans & McCoy
ATTORNEYS

Patented May 27, 1952

2,598,115

UNITED STATES PATENT OFFICE 2,598,115

RESILIENT MOUNTING

Howard M. Dodge, Wabash, Ind., assignor to The General Tire and Rubber Company, Akron, Ohio, a corporation of Ohio Application October 20, 1948, Serial No. 55,529

2 Claims. (Cl. 287—85)

This invention relates to resilient mountings, couplings, bearings and the like, in which an outer rigid sleeve is joined to a concentric core by means of a radially compressed elastic bushing of rubber interposed between the sleeve and core.

The rubber bushing which joins the outer sleeve to the core member is normally of a radial thickness much greater than the radial depth of the space between the core member and sleeve and for this reason rubber bushings as heretofore constructed have exposed end surfaces which are under tension. Elastic rubber surfaces which are under tension and exposed to air are subject to cracking and consequent deterioration.

The present invention has for an object to provide a rubber bushing that is so formed that when the bushing is placed under compression between a sleeve and core member its exposed end edges are substantially unstressed and less subject to deterioration by the action of air.

It is common practice to employ a core member of greater length than the outer rigid sleeve and to provide a rubber bushing of such length that its end portions project beyond the ends of the rigid outer sleeve. Such rubber bushings have had end portions of reduced external diameter but of the same internal diameter as the body of the bushing so that the ends of the rubber bushing are stretched around the core member and are under tension.

The present invention has for an object to provide elastic rubber bushings such as above referred to with projecting end portions that are substantially unstressed.

In devices of the character referred to it is desirable that the radially compressed elastic rubber bushing be properly positioned between the core member and outer sleeve so that it is uniformly stressed throughout. By providing the bushing with substantially unstressed end portions projecting beyond the ends of the outer rigid sleeve the present invention provides the bushing with visible portions that are readily deformed when the body of the bushing is improperly placed between the sleeve and core, thus facilitating inspection and facilitating the production of mountings in which the confined portions of the bushing are uniformly stressed throughout.

With the above and other objects in view, the invention may be said to comprise the resilient mounting as illustrated in the accompanying drawings and hereinafter described, together with such variations and modifications thereof as will be apparent to one skilled in the art to which the invention pertains.

Reference should be had to the accompanying drawings forming a part of this specification, in which.

Figure 1:
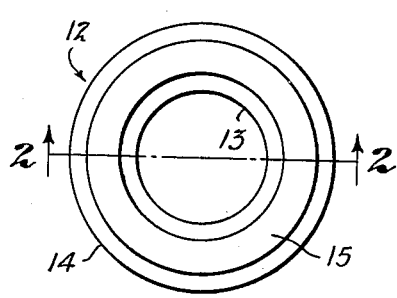
Figure 1 is an end elevation of a rubber bushing embodying the invention.
Figure 2:
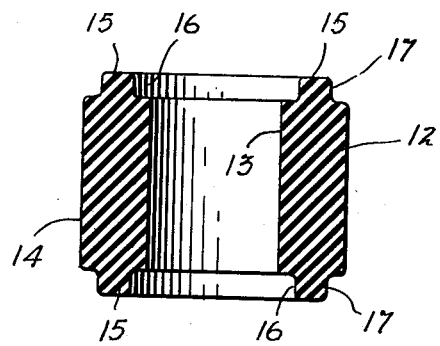
Fig. 2 is a longitudinal section taken on the line indicated at 2—2 in Fig. 1.

In the accompanying drawings a resilient mounting is shown consisting of an inner tubular core member 10 and an outer rigid sleeve 11, together with an elastic rubber bushing 12 held under radial compression between the tubular core member 10 and tubular sleeve 11. As shown in Fig. 2, the elastic rubber bushing 12 is formed with an interior cylindrical surface 13 that is of a diameter materially less than the external diameter of the tubular core member 10, and an external cylindrical surface 14 that is of a diameter materially greater than the internal diameter of the outer sleeve 11 of the mounting.

The bushing 12 has an annular projection 15 at each end and each of these projections 15 has an internal surface 16 of a diameter substantially the same as the external diameter of the core member 10, and an external surface 17 of substantially the same diameter as the internal surface of the outer sleeve 11 of the core member.

Figure 3:
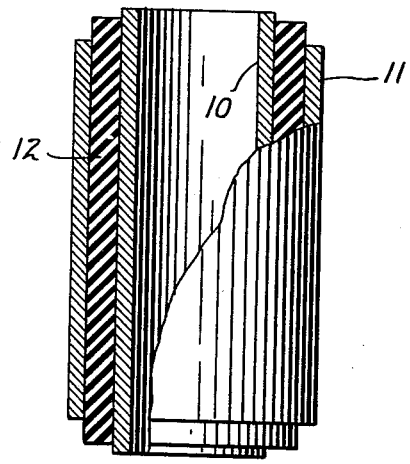
Fig. 3 is a sectional elevation showing the resilient mounting with the bushing shown in Figs. 1 and 2 in place therein.

The elastic rubber bushing 12 may be assembled with the core member 10 and sleeve 11 by methods well known in the art. For example, the bushing 12 may be forced endwise through a funnel into the sleeve 11, after which the core member 10 may be entered into the interior of the sleeve 12 behind a tapered mandrel. By reason of the fact that the annular projections 15 are in a neutral zone and require neither stretching nor compression to cause them to conform to the external surface of the core member 10 or to the internal surface of the sleeve 11, these projecting end portions 15 will form substantially unstressed end portions of the bushing when the bushing is assembled between the core member and sleeve as shown in Fig. 3 of the drawing, providing the bushing with unstressed end portions whose exposed surfaces are capable of withstanding the action of air without cracking.

A further advantage of the construction herein disclosed is that the end portions of the bushing are easily distortable and when distorted indicate improper placement of the bushing between the core member and the sleeve.

The bushing of the present invention, therefore, facilitates inspection of the finished mountings and shows up relatively slight misplacements of the rubber bushing with respect to the core member and sleeve which can be corrected by proper adjustments of the assembling machine so that mountings of better quality may be produced.

It is to be understood that variations and modifications of the specific devices herein shown and described for purposes of illustration, may be made without departing from the spirit of the invention.

What I claim is:

1. A resilient mounting comprising a rigid elongated core, a rigid outer tube shorter than the core, and a tubular elastic rubber bushing surrounding the core within said tube and under radial compression between the tube and the core, said bushing having an elongated body portion of substantially uniform radial thickness from end to end and formed to an internal diameter materially less than the external diameter of said core and to an external diameter materially greater than the internal diameter of said tube and tubular end portions projecting from said body portion that are of less radial thickness than the body portion and that conform without stretching to the exterior of the core, said end portions of the bushing being unstressed in the assembled mounting and being exposed beyond the ends of said outer tube.

2. A resilient mounting comprising a rigid elongated externally cylindrical core, a rigid outer internally cylindrical tube, and a tubular elastic rubber bushing surrounding said core within the tube, said bushing being under radial compression between said core and tube, said bushing being formed with an internally and externally cylindrical body portion normally of an internal diameter materially less than the external diameter of the core and of an external diameter materially greater than the internal diameter of the tube, said tubular bushing having end portions formed concentric with said body portion and to internal and external diameter substantially the same as the external diameter of the core and the internal diameter of the tube, whereby the said end portions are unstressed in the assembled mounting.

HOWARD M. DODGE.

REFERENCES CITED

The following references are of record in the file of this patent:

UNITED STATES PATENTS

| Number | Name | Date |
|---|---|---|
| 1,937,581 | Lord | Dec. 5, 1933 |
| 2,115,713 | Haire | May 3, 1938 |
| 2,468,985 | Kratz | May 3, 1949 |

FOREIGN PATENTS

| Number | Country | Date |
|---|---|---|
| 213,019 | Great Britain | of 1924 |